Patented Sept. 29, 1942

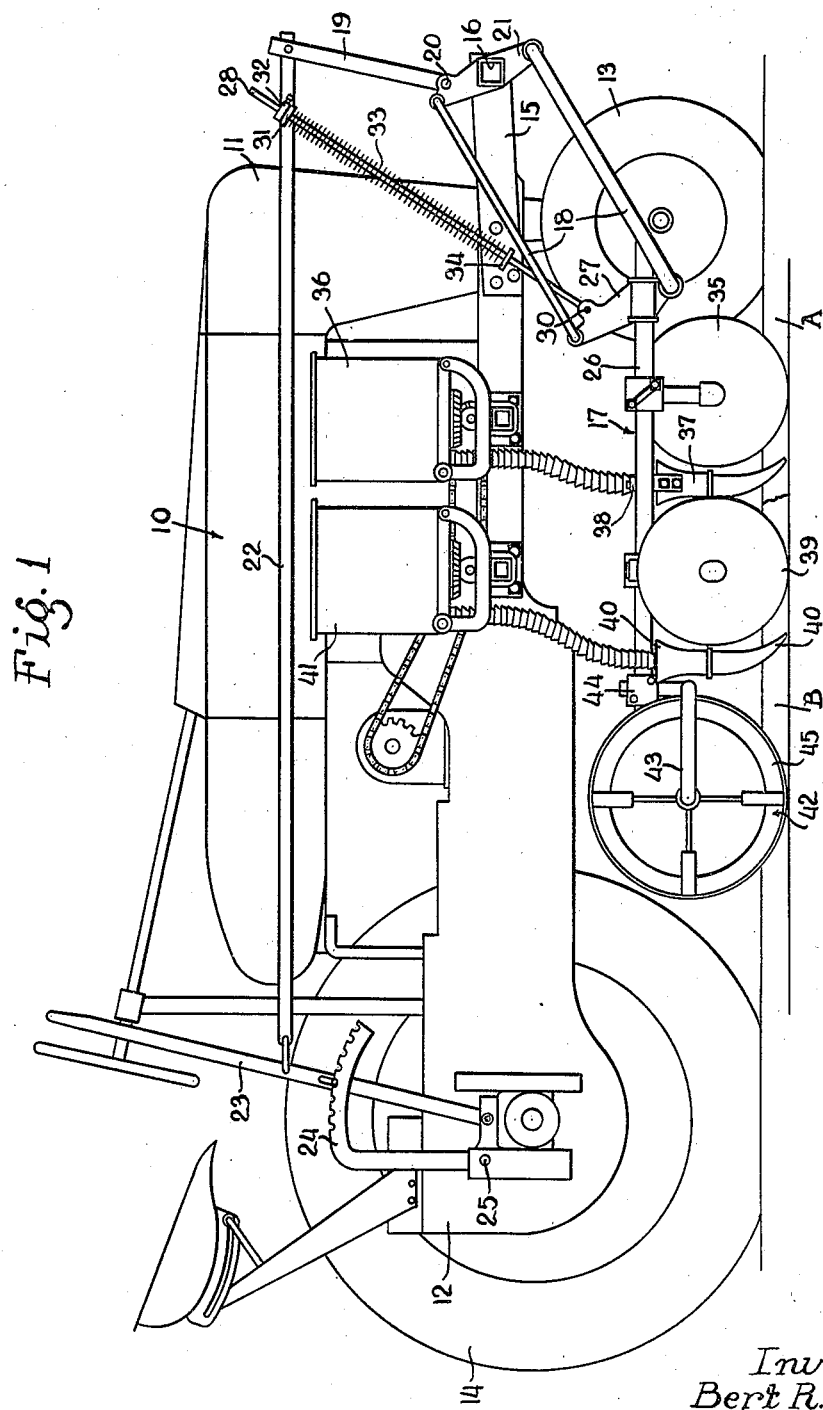

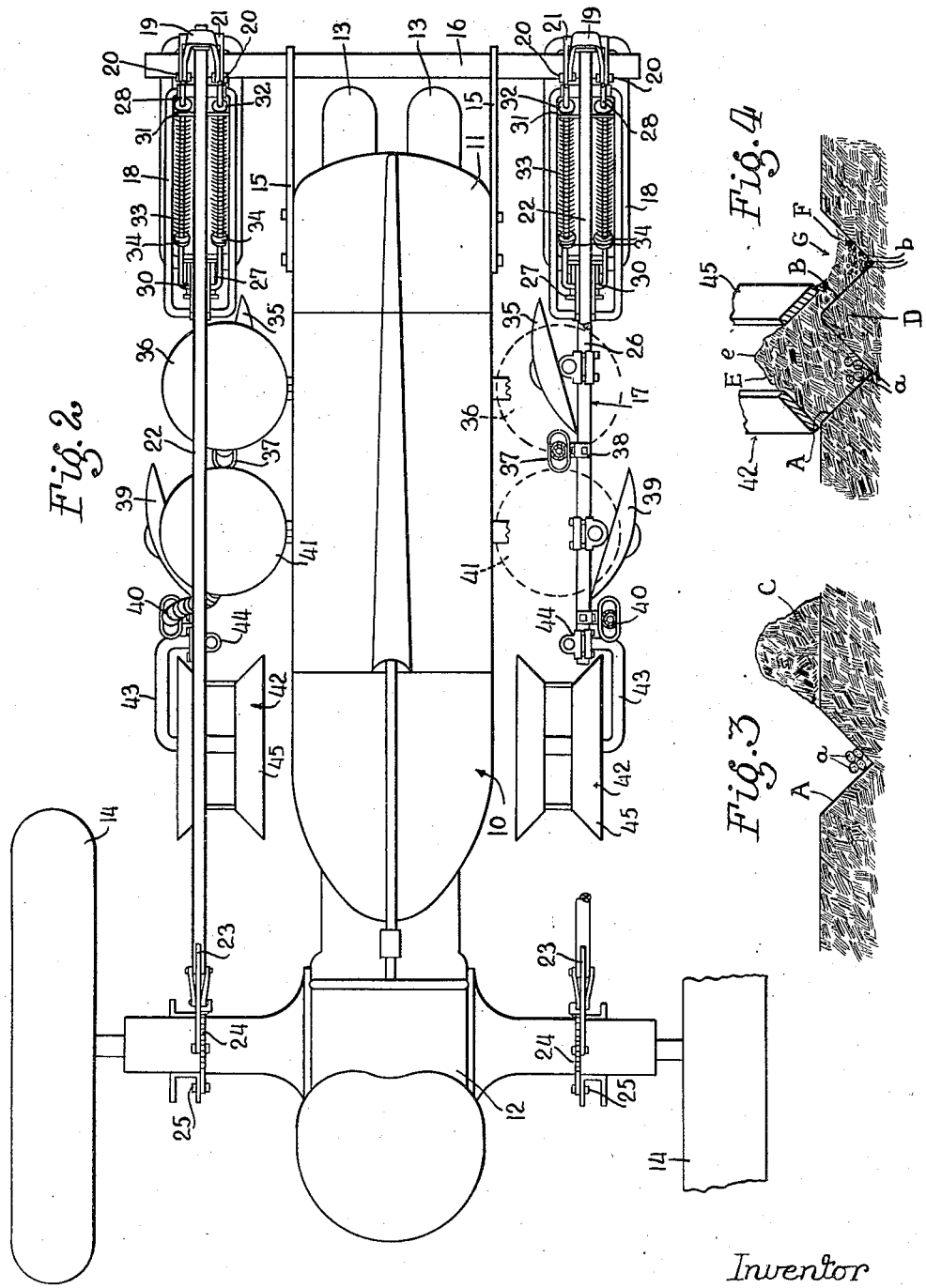

2,297,384

UNITED STATES PATENT OFFICE 2,297,384

TRACTOR PLANTER

Bert R. Benjamin, Oak Park, Ill., assignor to International Harvester Company, a corporation of New Jersey Application October 30, 1940, Serial No. 363,534

5 Claims. (Cl. 111—73)

This invention relates to planting arrangements and more particularly to such arrangements which supply fertilizer at the time of planting.

It is an object of the present invention to provide a planting arrangement wherein a fertilizer furrow will be located adjacent and parallel with the seed furrow and left partially open so that moisture may be collected to insure adequate distribution of fertilizer material throughout the soil.

It is another object of the invention to provide an arrangement wherein a spacing of settled or somewhat packed ground will be provided between the seed furrow and the fertilizer furrow in order to limit the absorption of moisture immediately surrounding the seed within the seed furrow.

It is another object of the invention to provide all of the equipment for effecting the opening of seed and fertilizer furrows as well as of the pressing means wherein all these various means may be connected to the tractor as a unit and vertically adjustable in unison with respect thereto.

According to the present invention there has been provided an arrangement of working tools connected to a single supporting frame which is in turn connected to the tractor for vertical adjustment. These tools include a seed furrow forming tool and a fertilizer furrow forming tool located in rear of the seed furrow forming tool and arranged to throw the dirt originally taken from the seed furrow back into the seed furrow to cover up seed and to simultaneously form adjacent to the original seed furrow, a fertilizer furrow into which fertilizer may be deposited. A seed dispensing tube is also connected to the same common frame between the respective furrow opening tools so that the seed will be deposited prior to the opening of the fertilizer furrow. Immediately following the fertilizer furrow opening tool is a fertilizer depositing means and a pressing means alined to press the dirt thrown over the seed furrow and as well to cause limited portions of the same dirt to be pressed into the fertilizer furrow over the fertilizer, but only such portions as to leave the fertilizer furrow open for collecting of moisture. By having the furrow opening tools so arranged or offset with respect to each other there is provided a soil partition between the fertilizer and the seed which is somewhat hard and compact as compared to the loose dirt thrown over the seed. By having this spacing of dirt of this consistency, the fertilizer will be kept from absorbing moisture from the dirt in and around the seed during a dry spell which may follow the planting operation.

For other objects, and for a better understanding of the invention, reference may be had to the following detailed description taken in connection with the accompanying drawings; in which:

Figure 1 is a side view in elevation of a tractor with the planting arrangement of the present invention connected thereto for vertical adjustment;

Figure 2 is a plan view showing more clearly the arrangement of the individual working tools with respect to each other and with respect to the tractor.

Figure 3 is a view in elevation of a cross-section of the ground showing the same after the seed furrow has been formed and seed deposited therein; and, Figure 4 is a view similar to Figure 3, showing the ground in cross-section with the fertilizer in the fertilizer furrow and with the seed in the seed furrow covered and pressed against the seed.

Referring now particularly to Figures 1 and 2, there is shown a tractor 10 having a forward body portion 11 and a rear axle portion 12. The forward body portion 11 is supported by the forward dirigible wheels 13, while the rear portion 12 is supported by the rear drive wheels 14. Extending forwardly of the forward portion 11 is a bracket structure 15 rigidly connected to the tractor and supporting a transverse tool bar structure 16. This tool bar structure 16 extends laterally from both sides of the tractor and to the same is connected a supporting frame structure 17 by means of a parallel link arrangement 18, well known in the art. The frame structure 17 may be that of a regular cultivating attachment to which the various tool means of the present invention are attached. By means of the parallel link arrangement 18, this tool supporting frame structure 17 is vertically adjustable with respect to the transverse bar 16 and consequently with respect to the tractor. As a means for effecting vertical adjustment there may be provided a fore and aft movable lever 19 pivoted at 20 to a bracket structure 21 carried by the transverse bar 16 and forming a part of the parallel link structure 18. Extending rearwardly from the free and upper end of the lever 19 is a longitudinally extending lift pipe 22 connected at its rear end to a manual adjusting lever 23 adapted to work over a quadrant 24 rigidly connected to the rear portion 12 of the tractor as indicated at 25. By the operation of the manual lever 23 the frame structure 17 can be brought to any level that is desired.

The frame structure 17 includes a single longitudinally extending tool beam 26 adapted to have its forward end fitted within a bracket 27, also forming a part of the parallel link structure 18. Lifting is effected through a lift rod 28 connected to the forward end of the lift pipe 22 and having its rear end connected to the bracket 27 at 30. The connection to the lift pipe 22 is effected through a laterally extending flange 31, through which the lift rod 28 extends and is retained by a lift collar 32 adapted to be fixed to the rod 28. The usual pressure spring 33 is effective when the lever 23 is in engagement with its quadrant 24 and will react against the supporting frame structure 17 by engagement at its lower end with a collar 34 fixed to the rod 28.

Connected to the tool beam 26 near to its point of connection with the bracket 27 is a concavo-convex furrow forming disk means 35. This disk forms the seed furrow into which seed is deposited by means of a seed dispensing mechanism 36 having a seed spout 37 directly connected to the tool beam 26 at 38 and immediately following the disk tool 35. Once the seed has been deposited, as illustrated in Figure 3, the next operation which takes place is to cover the seed in the furrow. Referring particularly to Figure 3, this seed furrow is designated by the letter A and the seed within the furrow is designated by the letter $a$.

Immediately following the seed dispensing spout 37 is located a second furrow forming tool 39, likewise of concavo-convex shape, but located on the opposite side of the tool beam 26 and arranged to oppose the seed furrow forming tool 35. Thus, is formed the fertilizer furrow, which may be designated in Figure 4 by the letter B. In forming of this furrow B, not only the dirt C, taken from the seed furrow, but also the dirt taken out of the fertilizer furrow B, will be thrown laterally into and over the seed furrow A, thus leaving the fertilizer furrow open for the depositing of fertilizer, designated by letter $b$, therein.

It will be apparent that when the fertilizer furrow is formed there will be provided a spacing D of undisturbed dirt between the seed and the fertilizer furrows. Since this dirt D is undisturbed, it will retain its moisture and thus fertilizer $b$ will not have to seek moisture during dry spells from dirt immediately surrounding the seed $a$ in the seed furrow A. The ground having been settled sometime prior to the seed planting operation, will have permitted this dirt D to have absorbed considerable moisture and to have become considerably packed.

As shown in Figure 4, there is provided dirt designated as E immediately above the seed $a$. Immediately following the fertilizer furrow opening disk 30 is a fertilizer spout 40 adapted to receive fertilizer from a fertilizer dispensing can 41. This fertilizing mechanism including the spout 40 and fertilizing can 41 serves to deposit the fertilizer $b$ in the fertilizer furrow B. It is apparent from this, that this operation follows immediately after the fertilizer furrow B has been opened.

Once the dirt C and the dirt from the fertilizer furrow B has been moved laterally over the seed in the seed furrow A, there will be provided a large pile of dirt E over the seed. This dirt will be shaped into a point $e$ and is then packed about the seed by a pressing wheel means 42 likewise carried by the tool beam 26. This covering wheel 42 is connected to the beam 26 by means of a standard 43, clamped as indicated at 44 to the rear end of the beam. The wheel 42 is of such width and so arranged with respect to the disk tools 35 and 39 that one of its portions 45 will extend laterally beyond the edge of the seed furrow to effect and cause also a pressing of dirt F in limited portions over the fertilizer $b$ in the fertilizer furrow B. This dirt F is only of sufficient amount to cover the fertilizer but not of such an amount to fully fill the fertilizer furrow B. Thus, the fertilizer furrow will have a continual opening G into which water may soak during the rain which may immediately follow the planting. This water will thereby be retained immediately in a location near to the seed so that the fertilizer $b$ will be adequately and sufficiently distributed and directed toward the seed $a$.

It should now be apparent that there has been provided an arrangement for planting and fertilizing of the planted seed all in one operation wherein the units effecting this result are located on a single common supporting frame and which is in turn vertically adjustable with respect to the tractor; that, by such an arrangement where care is taken in the locating of the fertilizer with respect to the seed, the possibility of the seed becoming harmed during a dry spell which may follow the planting and furrow operation, has greatly been reduced.

While various changes may be made in the detail construction of the arrangement shown and described herein, it shall be understood that such changes shall be within the spirit and scope of the present invention as defined by the appended claims.

What is claimed is:

1. In combination, means for forming a seed furrow, seed dispensing means for dropping seed in the seed furrow, means for forming a fertilizer furrow offset from the seed furrow and arranged to simultaneously throw dirt therefrom over the seed in the seed furrow, and fertilizer dispensing means for depositing fertilizer in the fertilizer furrow, and means for pressing the dirt over the seed furrow and simultaneously directing limited portions of the dirt over the fertilizer in the fertilizer furrow.

2. In combination, means for forming a seed furrow, seed dispensing means for dropping seed in the seed furrow, means for forming a fertilizer furrow offset from the seed furrow and arranged to simultaneously throw dirt therefrom over the seed in the seed furrow, and fertilizer dispensing means for depositing fertilizer in the fertilizer furrow, and means for pressing the dirt over the seed furrow and simultaneously directing limited portions of the dirt over the fertilizer in the fertilizer furrow, a supporting structure, and all of said various means being connected to said supporting structure.

3. In combination, a concavo-convex disk arranged to form a seed furrow, seed dispensing means for dropping seed in the seed furrow, a second concavo-convex disk opposing said first mentioned disk to form a fertilizer furrow adjacent to the seed furrow and to simultaneously cover the seed in the seed furrow with dirt originally taken from the seed furrow and with dirt from the fertilizer furrow, and means for pressing the dirt onto the seed and for simultaneously directing limited portions of the dirt over the fertilizer in the fertilizer furrow.

4. In combination, a tractor, a frame structure connected to the tractor for vertical adjustment, a concavo-convex disk connected to the frame structure and arranged to form a seed furrow, seed dispensing means associated with the frame structure for dropping seed in the furrow, a second concavo-convex disk connected to the frame structure and arranged in opposing relation with respect to the first mentioned disk, said second disk also arranged to form a fertilizer furrow adjacent to the seed furrow and to simultaneously cover the seed in the seed furrow with dirt originally taken therefrom and with dirt from the fertilizer furrow, means associated with said frame structure for depositing fertilizer in the fertilizer furrow, means carried by the frame structure for pressing the dirt down upon the seed and for simultaneously directing portions of the dirt over the fertilizer in the fertilizer furrow, and means for adjusting the frame structure and the seed and fertilizer dispensing means associated therewith.

5. In combination, a tractor, a tool frame connected to the tractor for movement to and from a working position, means on the tool frame for forming a seed furrow, seed dispensing mechanism including a seed dispensing device carried on the tractor and a seed spout device on the tool frame for directing the seed for the dispensing device to the seed furrow, means on the tool frame for forming a fertilizer furrow offset from the seed furrow and arranged to simultaneously throw dirt over the seed in the seed furrow, fertilizer dispensing mechanism including a fertilizer dispensing device carried on the tractor and a fertilizer spout device on the tool frame for directing fertilizer into the fertilizer furrow, and means on the tractor for raising the tool frame to a transport position.

BERT R. BENJAMIN.